United States Patent

[11] 3,604,900

| [72] | Inventor | Charles G. Kalt |
| | | Williamstown, Mass. |
| [21] | Appl. No. | 839,500 |
| [22] | Filed | July 7, 1969 |
| [45] | Patented | Sept. 14, 9171 |
| [73] | Assignee | Sprague Electric Company |
| | | No. Adams, Mass. |

[54] ELECTRONIC CREDIT CARD
2 Claims, 4 Drawing Figs.

[52] U.S. Cl. .................................................. 235/61.12
N, 340/149 A
[51] Int. Cl. ....................................................... G06r 19/00
[50] Field of Search ........................................... 235/61.12,
61.12 NP, 61.12 M, 61.12 C, 61.7 B; 340/149,
173; 200/46

[56] References Cited
UNITED STATES PATENTS

| 2,448,761 | 9/1948 | Armbruster | 235/61.12 |
| 2,774,060 | 12/1956 | Thompson | 235/61.12 |
| 2,914,746 | 11/1959 | James | 340/149 |
| 3,171,100 | 2/1965 | Rajchman | 340/173 |
| 3,387,265 | 6/1968 | Smeiman | 235/61.12 |
| 3,470,359 | 9/1969 | Esterly | 235/61.12 |

Primary Examiner—Thomas A. Robinson
Attorneys—Connolly and Hutz, Vincent H. Sweeney, James Paul O'Sullivan and David R. Thornton

ABSTRACT: An electrically encoded credit card includes encoded information in the form of electrical elements and is adapted for decoding by a card-reading means for advising a merchant as to customer identification and credit rating.

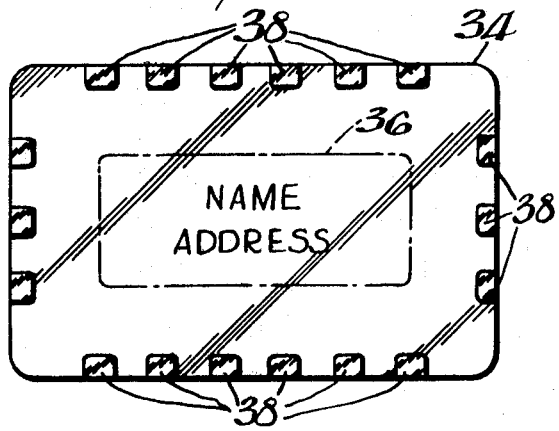
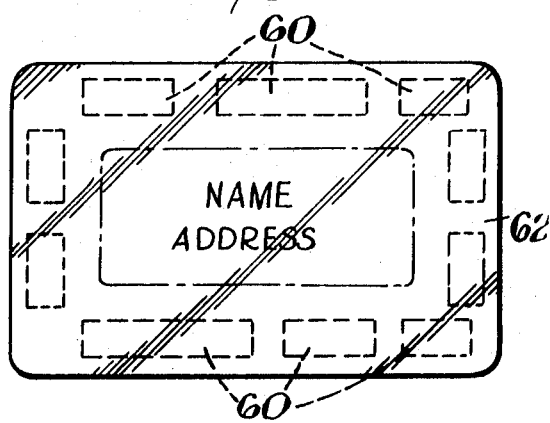
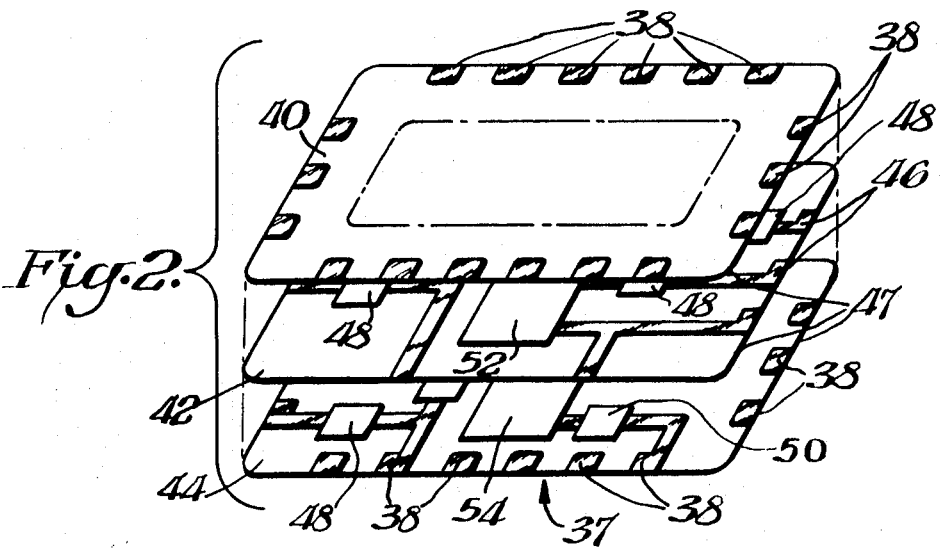
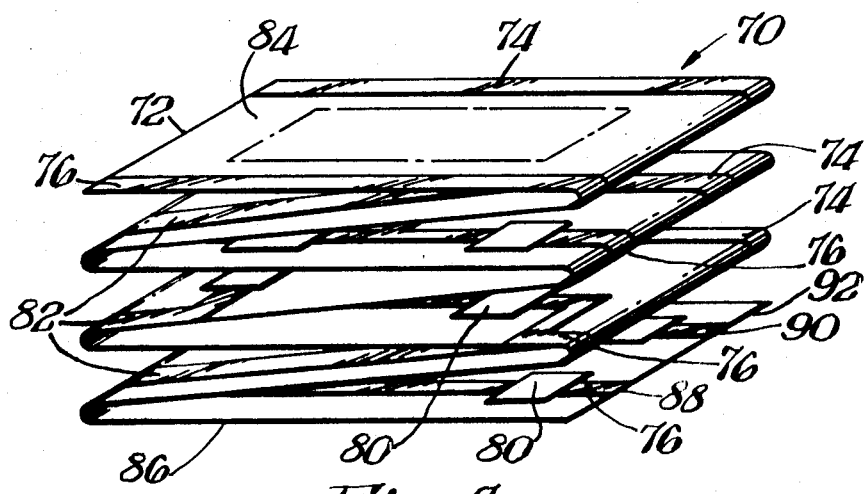

ELECTRONIC CREDIT CARD

BACKGROUND OF THE INVENTION

The invention relates to a credit card and more particularly to an electronic credit card in which encoded information is stored in the form of electrical elements.

In modern commercial transactions, the rapid determination of the credit rating of a customer is becoming of increasing importance. For maximum effectiveness, this involves both identification of the customer and an appraisal of his personal credit rating. It is also important that the latter information be maintained in confidence.

In the present state of the art, credit cards generally name a particular person as a reasonable credit risk but fail to provide definitive information as to whether the bearer is the named owner of the card, or as to the present credit balance of the owner.

It is an object of this invention to provide a stored-memory credit card.

It is another object of this invention to provide a credit card having cryptographically stored information.

It is a further object of this invention to provide an electronic credit card.

It is a stillfurther object of this invention to provide a credit card having customer identification and credit information electronically encoded in the card.

SUMMARY OF THE INVENTION

Broadly, an electronic credit card provided in accordance with the invention comprises a card of insulative material having electrical elements disposed therein, the elements being coupled to selected terminal areas with elements of each area being predetermined in accordance with information relating to the card owner, and the terminal areas being adapted for external coupling to a card-reading means for evaluating the elements and their arrangement so as to determine the information encoded thereby.

BRIEF DESCRIPTION OF THE DRAWING

FIG. 1 is a plan view of one embodiment of a credit card provided in accordance with the invention;

FIG. 2 is a perspective view illustrating the laminated construction of the card of FIG. 1;

FIG. 3 is a plan view of another embodiment in which the credit card is adapted for capacitive reading of the encoded information; and FIG. 4 is a view in perspective depicting a folded-card construction.

DESCRIPTION OF THE PREFERRED EMBODIMENTS

The credit card of the invention is a stored-memory credit card which preferably includes both alpha-numerical indicia and encoded electrical information. The encoded information may relate to the physical description and other facts for identification of the customer as well as his credit rating. The card is adapted for use with a card-reading machine which electronically scans the card to advise the merchant as to such information.

For example, when a transaction is to be made between a customer and a tradesman for merchandise or services etc., the customer presents an electronic credit card constructed in accordance with the invention. The card is positioned in a card-reading machine (not shown) and electrically coupled thereto; for example, by direct low resistance contact to card terminals, or capacitive or inductive coupling to the terminal areas or the like. The reading machine is adapted to sense the electrically encoded information and read it out to the merchant, or alternatively to a local bank.

For example, the information may be converted by the reading machine into tone-modulated pulses for telephone transmission by data phone to the computer of the local bank. At the local bank, a receiving circuit may convert the pulses to digital information which is fed to the bank's computer or to that of the customer's bank. The computer compares the digital information for example, customer's name, address, social security number and credit rating against the computer memory, and returns appropriate information over the data phone to the card-reading machine and the merchant for identification of the customer and his credit rating.

As shown in FIGS. 1 and 2, the electronic credit card 34 may be made up of metallized plastic laminations such as a metallized polyester or the like. Card 34 includes both alpha-numerical indicia 36 (for man-readable identification of the card) and a matrix of electrical components 37 which connect to terminal areas of card 34, in this case, to edge terminals 38.

Preferably, card 34 is made up of two or more plies or sheets, for example sheets 40, 42 and 44, of insulative material, for example of an organic polymer such as a polyester or the like. The lower sheets 42, 44 carry electronic components such as resistors, inductors and capacitors on their upper surfaces which are interconnected by conductive paths 46 of aluminum or the like.

Hence, conventional thin film elements or the like, such as resistors 48 and inductors 50, are deposited on sheets 42, 44 in connection to paths 46 which extend between the elements and the edge of the sheet. Conductive areas 52 and 54 of aluminum or the like are also deposited on both sheets in an overlying relationship to form electrodes which in combination with the interposed dielectric material of sheet 42 provide a large capacitance. Thin film capacitors which include an additional dielectric film could also be employed.

In this embodiment, strips 46 are extended to or over the sheet edge 47 to the other side (not shown) such that strips 46 are connected in the assembled card 34 to edge terminals 38 which are provided on layers 40 and 42, and extended around the card edge. Hence, edge connections 38 provide both vertical conductors and external contact terminals for the unit.

The value and type (e.g., resistor, capacitor etc.), of each element as well as the particular arrangement on the card, for example, the particular terminal areas to which they are coupled, all combine to determine the stored information. Hence, the elements and their arrangement may be provided in accordance with selected coding functions so as to cryptographically encode the information for each customer or class of customers. For example, the information may be scrambled by introducing random information bits or elements in connection to particular terminal areas, or by variation in the coupling arrangement of the elements to particular terminal areas. In this embodiment, the card-reading machine would have to be instructed (for example by a code number or the like supplied at time of sale by the card owner) to read only particular terminal areas, or read them in a particular sequence. Hence, in addition to storing the required information, the card may be coded for intelligible reading only in accordance with the particular coding function reserved for the customer.

Capacitive or inductive coupling of the credit card to the reading circuit may also be employed. Hence, as shown in FIG. 3, electrodes 60 (shown in dotted outline) of aluminum or the like may be disposed on a center ply, for example, in selected areas or regions of a laminated, or molded card 62. Card reading is achieved by mounting external electrodes over particular card areas. In this case, the capacitance is determined by the area of the embedded electrodes and the thickness of dielectric between the electrode and the card surface.

The buried electrodes may also be connected to other card elements. Moreover, electrodes 60 may also be used as mere capacitively coupled terminals. Advantageously, for use as terminals only, electrodes 60 may be substantially uniform in area so as to provide equal capacitance. This then provides uniform coupling to the card-reading machine without direct terminal contact.

In a further embodiment shown in FIG. 4, a credit card 70 is made up of a single continuous strip 72 of plastic material or the like which is folded into a card form. In this construction conductive paths 74 and 76 of aluminum, or the like, are extended throughout the length of strip 72 to provide connection to thin film components 80 which are interposed or connected along conductive paths 74 and 76. Similarly conductive paths and components may be provided on the other side of the strip 72, as shown at 82. Insulative strip 72 is then folded as shown, with abutting surfaces bonded together with adhesive material, or for example, by pressing and heating the folded units when strip 72 is made of thermoplastic, or the like.

This construction provides a pair of contact strips 74, 76 on the upper surface 84 of the card. The ends 88, 90 of paths 74 and 76 may be extended over the end 92 of sheet 72 to provide contact strips (not shown) on the underside 86. The conductive paths (shown at 82) of the alternate surface of strip 70 may be similarly extended to outer surfaces 84 and 86. Advantageously, more than two conductive paths may be arranged on each side. Alternatively any two of the conductive paths may be interconnected within the card to provide a complete circuit from one path to another.

Many different conductive and insulative materials can be employed, as well as many different configurations. Hence although the invention has been illustrated and described in some detail, they are to be considered as illustrative and it is to be understood that the invention is not to be limited except as in the appended claims.

What is claimed is:

1. In an electronic credit card having laminated-insulative material with electrical elements thereon and terminal areas connected to the electrical elements adapted for external coupling the improvement which consists of sheets of organic polymer insulative material of dielectric properties having at least one sheet interposed between two other sheets which are immediately adjacent to the interposed sheet so that the interposed sheet and the immediately adjacent sheets form a three-layer combination of sheets, a first metallization on a major surface of the interposed sheet, a second metallization on the major surface of one of the adjacent sheets which abuts the interposed sheet, said first and second metalizations being separated by the dielectric material of the interposed sheet and in capacitive relationship, a plurality of edge terminals on said adjacent sheets and at least one metallized conductive strip on said interposed sheet contacting the first metallization and extending to the edge of the interposed sheet and terminating in contact with at least one of the edge terminals on an adjacent sheet whereby the edge terminals provide both vertical conductors and external contact terminals for the card.

2. The card of claim 1 wherein said sheets are flexibly connected continuously into a folded strip of material, and strip metalizations form conductive paths extending over the folded edges which make the flexible connections so as to provide conductive paths from one sheet to the other.